Jan. 3, 1939.                G. B. BAILEY ET AL                2,142,102
         POWER GENERATING ENGINE AND CONTROLLING MEANS THEREFOR
                     Filed April 8, 1935            3 Sheets-Sheet 1

Inventors
George B. Bailey
Edward G. Ivy
by James R. Hodder
Attorney

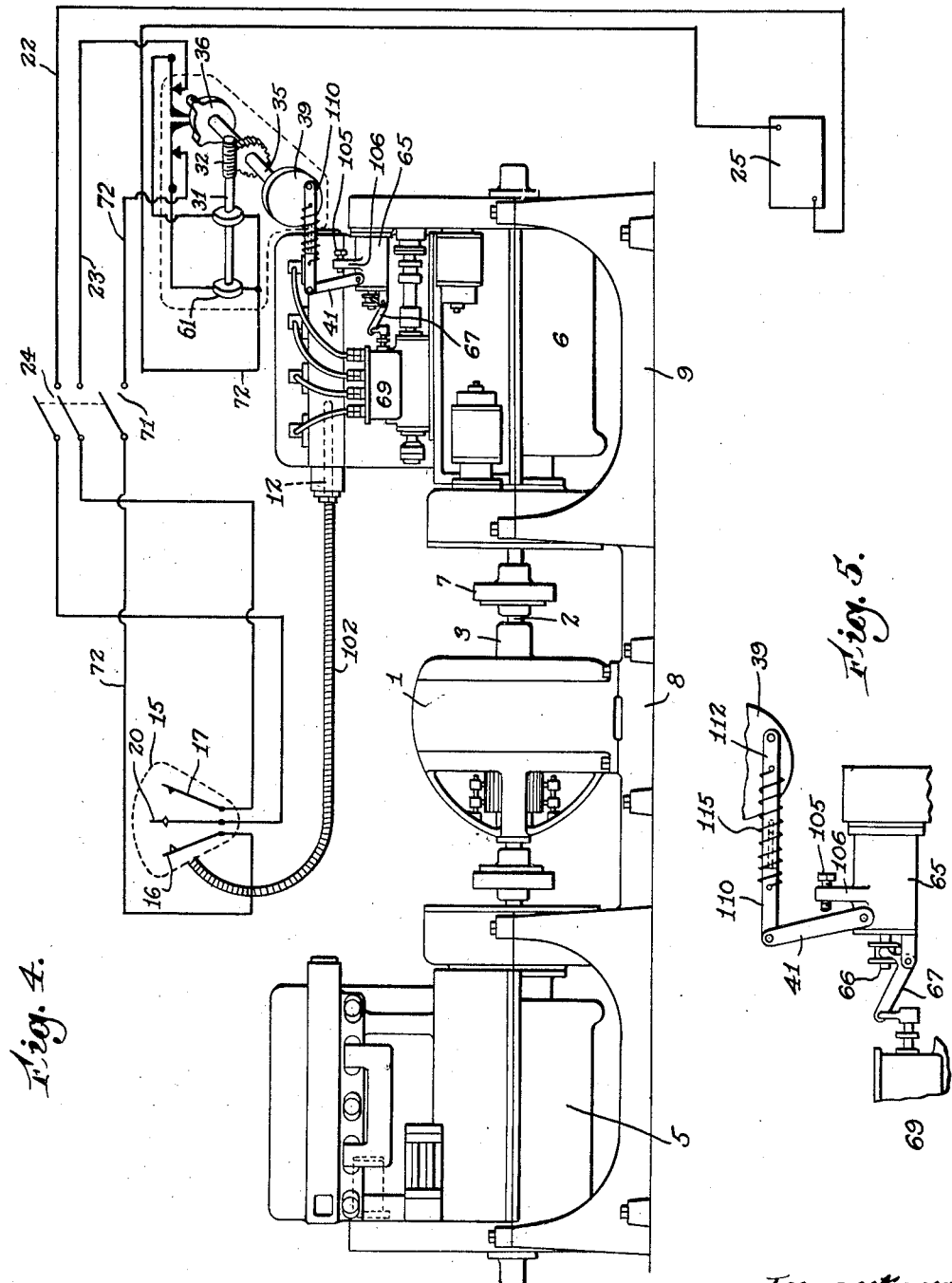

Patented Jan. 3, 1939

2,142,102

UNITED STATES PATENT OFFICE 2,142,102

POWER GENERATING ENGINE AND CONTROLLING MEANS THEREFOR

George B. Bailey, Sharon, and Edward G. Jay, Mansfield, Mass., assignors, by direct and mesne assignments, to Thermal Engineering Company, Boston, Mass., a corporation of Massachusetts Application April 8, 1935, Serial No. 15,166

3 Claims. (Cl. 123—108)

Our present invention is a novel and improved power generating unit, preferably an internal combustion engine, or a plurality of the same, and includes novel and automatic controlling means for either a single engine or a plurality.

Broadly considered, our invention is directed to means automatically actuated to control the operation of an internal combustion engine utilizing a varying temperature during the operation of the engine, or an equivalent means to control the governor adjustment of the fuel supply of the engine. Thus, it is an important feature of our present invention when applied to an internal combustion engine, and preferably of the Diesel type, to utilize a control of the governor adjustment and hence of the power of the engine by means of a thermostat actuated by the heat of the engine, preferably in association with the varying temperature of the exhaust from the engine.

It is also an important feature of the invention to utilize a multiplicity of internal combustion engines, with means automatically actuated during the operation of one engine to start, operate, and couple an adjacent engine, or successive engines, during predetermined times in the operation of the first engine or unit. Preferably, we utilize the varying temperature from the exhaust of one engine to control the coupling and power input of an adjacent engine dependent on the load requirements, and similarly from a second engine to a third, and so on.

A still further important feature of our present invention is the utilization of one or more combustion engines as the prime mover for an electrical generating power plant, and, preferably, to employ a plurality of engines adapted to be automatically started, operated, and coupled into actuating operation with said generating equipment and dependent upon the load or power requirements of the generating equipment. By the use of varying temperature from one engine, which is quickly responsive to the increased load carried by such engine, particularly in hydrocarbon engines of the Diesel engine type, we can secure a substantially immediate action through the operation of the thermostat and electrical connections to start, to operate, and to couple one or more engines in a power plant to the electrical generating equipment in response to the load requirement.

It is common knowledge that the temperature of the exhaust gases of a combustion engine gives a direct indication of the power which it is delivering. In the case of a Diesel engine, exhaust temperatures will vary approximately from 350° F. at no load to 700° F. at full load and up to about 1100° F. at 25% overload. Of course, the exhaust temperature may go even higher than 1100° F., but ordinarily beyond that temperature no additional power can be generated because the injection pumps are limited in their capacity to injecting only fuel sufficient to provide power for a 25% overload which, as stated, corresponds to an exhaust temperature of around 1100° F. There is no especial harm in operating a Diesel engine momentarily or even for a short period under an overload not exceeding 25%, but continued operation under such an overload would involve an excessive maintenance expense. When a Diesel engine is driving an electric generator, the exhaust temperature will give an immediate indication of the electrical energy being delivered by the generator or the current demand on the electrical circuit. As the electrical demand increases, exhaust temperature will also increase.

Also, it is a well-known fact that at a constant speed the efficiency of a Diesel engine will drop off as the load decreases. Therefore, in a Diesel-engine-driven electric plant comprising two or more units, as the load varies the various units are thrown in and out of operation in order to maintain as nearly as possible maximum efficient output of the units in operation. Furthermore, this saves considerably in the wear and tear on the equipment which, of course, is directly proportional to the number of hours of use.

Our present improved method and apparatus is of particular importance in enabling the utilization of a multiplicity of combustion engines to electrical generating equipment, with each engine or group of engines arranged to be "cut in" for operative actuation on the electrical generating equipment in direct response to the varying power requirements on the electrical generating unit.

Preferably, we arrange the plurality of combustion engines, to operate on the electrical generating equipment through an automatic clutch, thus permitting constant rotation of the generator, or generators, in one direction at all times so that at least one engine is operating through the overriding of the clutch connections with the idle engines, while also permitting instant actuation as soon as an additional engine is cut into operation and the same will pick up a proportionate load through its clutch connections.

Furthermore, several such combinations or systems can be operating in parallel, that is a plurality of generators being driven by their respective engines, or engine, through overriding clutches would be coupled together electrically and would keep running even though their respective prime movers may be shut down.

In such systems of a plurality of engines on a single generator, each engine can also be arranged to control its own power input to the system. For instance, a temperature of its own exhaust is a direct indication of the power which an engine is delivering and, therefore, a thermostatic element placed therein would operate a controller which, in turn, would control its own governing mechanism.

Heretofore, there has been great difficulty in coupling two or more engines to a single generator where a governing mechanism is incorporated on each engine. There is a tendency in such an arrangement for one of the engines to assume all of the load and, therefore, to run in an overloaded condition, in which case its exhaust temperature is excessive. A thermostatic control would automatically prevent such a condition by retarding the governor mechanism.

In carrying out our present invention and by utilizing standard apparatus, so far as practically incorporating our novel method, we have illustrated in the accompanying drawings an electrical generating equipment employing a plurality of power units of the Diesel combustion engine type, wherein one combustion engine is arranged for operation to drive the generator up to a load and speed for best efficiency of such engine, say 70 to 80% of capacity; and thereon to automatically start, operate, and couple an adjacent engine through the actuation of a thermostat arranged in heat-receiving relation with the exhaust of the first engine and suitable electrical connections to start and operate the second engine. The clutch connections afford automatic means for coupling the power input of the second unit so that when it has attained speed it will pick up a proportional amount of load on the generator.

Successive power units would be similarly cut in, and we have herein illustrated a group of four such power units in addition to a double engine power plant, but it will be understood that any number or series of groups of combustion engines might be utilized.

This feature is of great importance, permitting the installation of the desired power plant made up of a plurality of relatively small and efficient units; thus a 300 H. P. Diesel engine, by our invention, may be coupled with a set of three others and produce a 1200 H. P. plant, affording great economy in mass production, handling and shipping, as well as simplifying installation and repairs.

Referring to the drawings illustrating preferred embodiments of the invention,

Fig. 4 is a view of a single engine unit in accordance with our invention, and

Fig. 5 is an enlarged detail.

Figure 1:
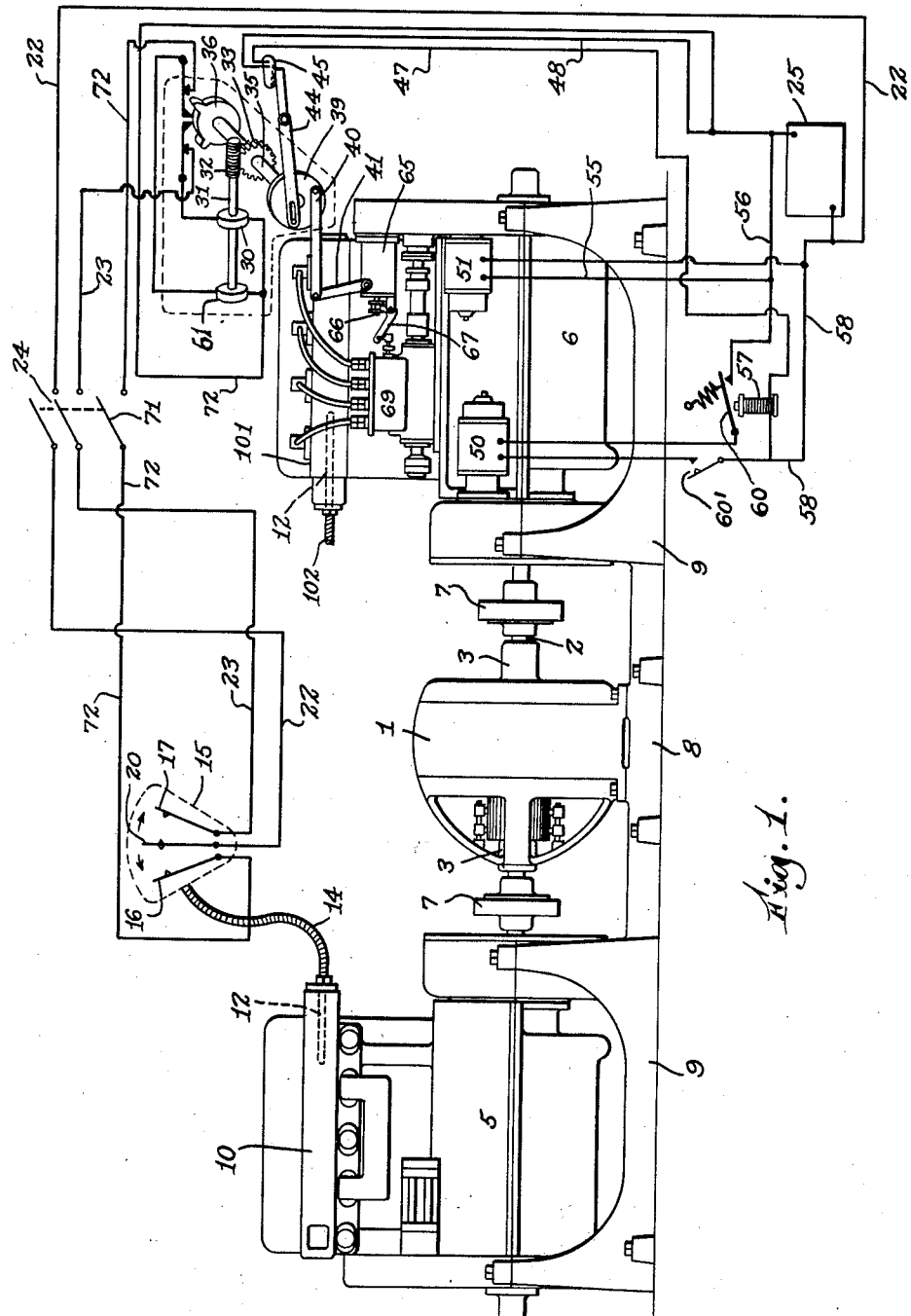
Fig. 1 is a diagrammatic view illustrating a plurality of two internal combustion engines in operative connection in accordance with our invention as an electrical generating power plant.
Figure 2:
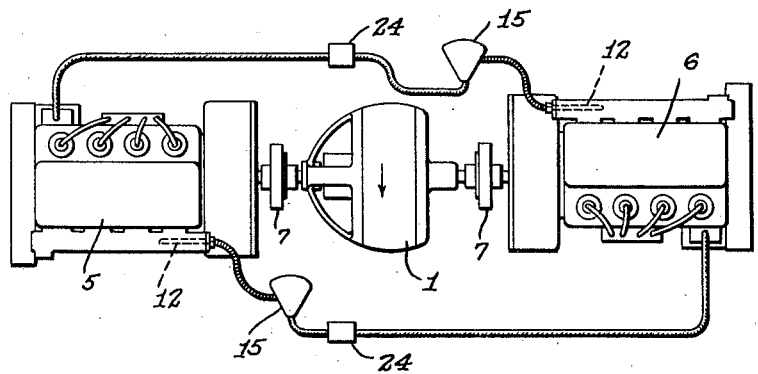
Fig. 2 is a plan view on a reduced scale of the two engines of Fig. 1.

Referring to Fig. 1, wherein we have illustrated in diagrammatic form a typical embodiment of our present invention, an electrical generating plant is indicated at 1 which has the generator mounted upon an axle 2 in suitable gearings 3—3, with a pair of internal combustion engines 5 and 6 mounted respectively at either side of the generator 1 and in alignment with the shaft 2, and coupled to the shaft 2 by clutches as indicated generally at 7—7.

These clutches may be any suitable and typical type of one-way clutches, over-riding or other automatic clutch power transmission devices. Suitable supports 8 for the generator 1 and 9—9 for the engines 5 and 6 are shown diagrammatically.

In the system illustrated in Fig. 1, we have designated the engine 5 as the prime mover, this being a typical internal combustion engine, preferably of the Diesel type, and with an exhaust manifold 10 in which is a temperature receiving thermostat 12, having conducting wires leading through a conduit 14 to an electrical switch 15. Thus for example, if the governor of engine 5 is set for a range of engine speeds from say about 1160 R. P. M. at no load to about 1240 R. P. M. at full load, corresponding to a normal operating generator speed of 1200 R. P. M., it may be desired to limit the load on engine 5 so that the temperature of the exhaust will normally be within a range from 480° F. to 620°. For such a range the contact points 16 and 17 of the thermostatic switch 15 are set for 480° and 620°, respectively. The moving contact member 20 being responsive to the thermostat 12 in the exhaust manifold 10, makes and breaks at the contacts 16 and 17 when said temperatures respectively occur.

Thus, upon the switch 15 being closed as, for example, when the contacts 20 and 17 are in electrical connection, the conducting wires 22 and 23 operating through the switch 24, which may be left closed, and taking power from the battery 25 will actuate the motor designated at 30 to turn the shaft 31 and, hence, through the worm 32 and gear 33 to rotate the shaft 35. This rotation of shaft 35, and crank wheel 39 will cause lever 44 to rock and tilt a Mercoid switch 45 to close a circuit between wire 48 connected to one terminal of the battery 25 and a wire 47 leading to a solenoid 57 which in turn is connected to the other terminal of the battery through wire 58 running hence from the starter 50. The energization of the solenoid 57 effects closure of switch 60 and thus establishes the circuit from battery 25, through wire 56, closed switch 60 wire 56, starter 50 and wire 58 back to the battery. This will cause the engine to turn over and after it becomes started any suitable auxiliary means (not shown) may be employed to break the circuit through the starter 50. The generator 51 will charge the battery 25.

Once the engine is started the motor 30 and its associated mechanism, including the link 40 and lever 41 will actuate the governor 65 and the latter, through plunger 66, bell-crank lever 67 and the speed controller 69 will bring the engine 6 to full operation. As soon as the motor 6 is thus in full operation it will, through the one-way clutch 7, pick up the load from the engine 5 and cooperate therewith to drive the generator 1 as long as the load continues and as long as the contacts 17 and 20 are closed.

If the load on the generator 1 falls below the requirement for a single engine, then the second engine 6 is shut off and stopped by the breaking of the contacts 17 and 20, due to decrease of temperature in exhaust manifold upon the thermostat 12, and the movement of the member 20 to the contact 16 thereby closing the circuit through the wires 72 and 22, the switch 71 being closed and operating the reverse motor 61 to shut off the engine 6.

When the load on the engine 5 again increases beyond the desired amount as indicated by the temperature of its exhaust, the thermostat 12 again effects movement of the electrical switch 15 to start up the engine 6, the latter being then actuated and operating through the one-way clutch 7 to help carry the load from the generator 1.

Thus parallel groups of engines may be placed in operative driving connection with a generator, or generators, as the load conditions require, and all this accomplished automatically.

Figure 3:
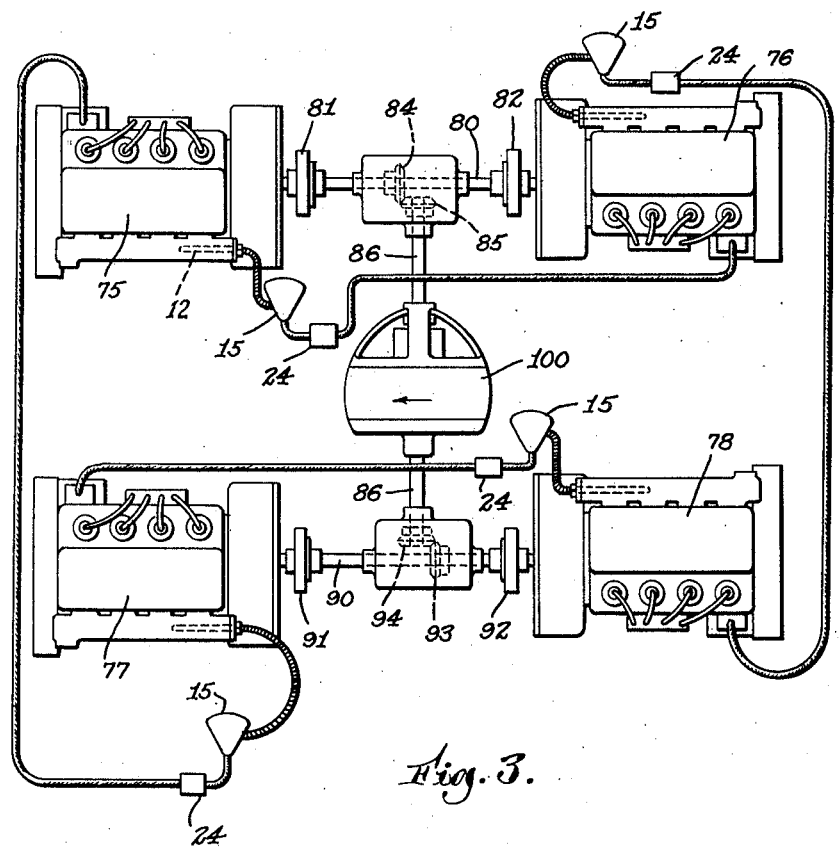
Fig. 3 is a diagrammatic view of four internal combustion engines operating in accordance with our invention in an electrical power generating system.

In Fig. 3 we have illustrated a plurality of four such engines, here designated in diagrammatic form as 75, 76, 77, and 78 with the exhaust thermostat 12 of the engine 75 operating through a duplicate switch 15 to actuate the engine 76, these two engines 75 and 76 being coupled on a single shaft 80 through one-way over-riding clutches 81 and 82 and through bevelled gears 84 and 85 arranged to turn the armature shaft 86 of the generator 100. Similarly, from the engine 76 the engine 78 may be cut in and from the engine 78 the engine 77 may be cut in, these latter two operating in unison through similar one-way clutches 91 and 92 on the shaft 90, with bevelled gears 93 and 94 coupling the same to the armature shaft 86, thus turning the generator 100 and coupling four engines to take care of the load requirements up to the combined capacity of the total number of engines coupled on the shaft 86. A further series of engines could be arranged operating through similar or corresponding bevelled gears to give a large number of separate engines all interconnected and automatically cut in and cut out as the load requirements on the generator varies.

While the important practicable service in which our present invention will probably be most useful consists in utilizing a plurality of two or more engines to share cooperatively the load requirements on a power generating plant, using the exhaust temperature of one engine to control the power input to another engine as above outlined, yet it is within the scope of the invention to control the power output of an engine through means actuated by its own exhaust temperature so that it will cooperate with other sources of power such as another prime mover. We have shown this arrangement in diagrammatic form in Figure 4 and Figure 5 as applied to engine 6 of a pair of engines 5 and 6.

To effect this control of an engine by its own exhaust temperature, we arrange the thermostat 12 in the exhaust manifold of the engine 6, leading wires from the same through the conduit 102 to the switch 15, whereupon the operation of the engine will be controlled by its own exhaust temperature acting through the thermostat 12, switch 15, reverse motor 61, and the mechanism associated with shaft 35. In this case the engine runs continuously after being started, and so the starting devices shown and described in the arrangement of Figure 1 are omitted in Figure 4. An adjustable stop 105 is threaded through a supporting standard 106 and limits the closing action of the governor adjustment lever 41. In this particular construction, as shown in detail in Fig. 5, we operate the lever 41 through a double link 110, having one end pivoted to the outer end of the lever 41 and the opposite end of the sliding portion 112 of said lever pivotally secured to the wheel 39 on the shaft 35, these sliding portions 110 and 112 being united by a spring 115. Thus, when the governor adjustment lever 41 strikes against the adjustable stop 105 during the rotation of the wheel or disc 39, the spring 115 will yield and allow the portions of the link 110 to slide relatively and thus avoid breaking of the mechanism.

In the arrangement shown in Figures 4 and 5, the engine 6 coacts with engine 5 to drive the generator 1. Without the control of the present invention, two such engines would not properly divide the load between them, but one would tend to assume all the load and even the overload. This would follow with the usual independent governor action on each engine. By employing the exhaust temperature of engine 6 to control the governing mechanism of that engine, any overloading of that engine will be prevented until a load is imposed which definitely requires overloading. That is to say, by setting the governor on engine 5 for a speed slightly under that corresponding to the maximum governor setting for engine 6, the latter engine will assume the load until its exhaust temperature and the control actuated thereby begins to reduce or retard the governor speed adjustment for engine 6. When this occurs, engine 5 will assume the remainder of the load not being carried by engine 6, and will continue to take any increase of load until such time as engine 5 reaches its full capacity as determined by the setting of its injection pump. After that any further increase in load, which in fact means an overload, will be carried by engine 6 up to the limit of the setting of its injection pump. In other words, while the normal limit of load carried by engine 6 is determined by the action of its exhaust temperature control bringing lever 41 up against the limiting stop 105, nevertheless if the load increases beyond the full capacity of engine 5, then engine 6 will then increase its share up to the full limit of its capacity as determined by the setting of its own injection pump 69. Thus it is to be understood that the improved control of an engine by its own exhaust temperature is not necessarily intended to definitely limit the power output of the engine, but to prevent that engine from normally assuming more than a predetermined load until the load demand is such as to make it necessary that the engine operate for a time at an overload.

It will be appreciated that other means and methods of uniting a plurality of power units with a generator or other work than the specific example herein described, for illustrative purposes, will readily occur to those skilled in the art but, so far as we are informed, we are entitled to claim herein broadly any high-speed responsive controlling means operating one power unit from another or a single power unit from itself, or any means in a plurality of power units to automatically control the starting and power input of an adjacent power unit.

We claim:

1. An engine in which heat is generated by combustion of fuel in the engine; thermostatic means actuated by the temperature of the products of combustion of said engine; fuel supply means; speed governing means responsive to the speed of the engine for regulating said fuel supply means to normally maintain said engine speed within a predetermined range with limits corresponding respectively to no load and full load conditions; and an operative connection between said thermostatic means and said governing means whereby the speed of the engine is varied within said limits in accordance with variations in the temperature of the products of combustion.

2. An engine in which heat is generated by combustion of fuel in the engine; a discharge conduit for the products of such combustion; thermostatic means located in said conduit and actuated by the temperature of said products; fuel supply means controlled by said thermostatic means, speed governing means responsive to the speed of the engine for determining the limits of permissible speed variation and capable of varying the speed between said limits; and mechanism in response to changes of said temperature for adjusting said speed governing means to change the speed within said limits in accordance with changes in the exhaust temperature.

3. An engine in which heat is generated by combustion of fuel in the engine; fuel supply means therefor; speed governing means responsive to the speed of the engine for adjusting said fuel supply means between predetermined limits of speed; thermostatic means actuated by the temperature of the products of combustion; and an operative connection between said thermostatic means and said speed governing means whereby the fuel supply to said engine is controlled between said limits of speed in accordance with the temperature of its products of combustion.

GEORGE B. BAILEY
EDWARD G. JAY.

CERTIFICATE OF CORRECTION.

Patent No. 2,142,102.                      January 3, 1939

GEORGE B. BAILEY, ET AL.

It is hereby certified that error appears in the printed specification of the above numbered patent requiring correction as follows: Page 4, first column, lines 14 and 15, claim 2, strike out the words and comma "controlled by said thermostatic means," and insert instead a semicolon; line 19, before "in" insert the words controlled by said thermostatic means; and that the said Letters Patent should be read with this correction therein that the same may conform to the record of the case in the Patent Office.

Signed and sealed this 21st day of February, A. D. 1939.

Henry Van Arsdale.
(Seal)                      Acting Commissioner of Patents.